(12) United States Patent
Puzanov et al.

(10) Patent No.: US 9,872,151 B1
(45) Date of Patent: Jan. 16, 2018

(54) SYSTEM AND METHOD FOR DISCOVERY AND COLLECTION OF REAL-TIME LOCATION DATA

(71) Applicant: Leantegra Inc., Wilmington, DE (US)

(72) Inventors: Oleg Puzanov, Kyiv (UA); Andrii Skriabin, Kyiv (UA); Ihor Korsun, Kyiv (UA); Oleh Hordiichuk, Kyiv (UA)

(73) Assignee: Leantegra Inc., Wilmington, DE (US)

( * ) Notice: Subject to any disclaimer, the term of this patent is extended or adjusted under 35 U.S.C. 154(b) by 0 days.

(21) Appl. No.: 15/246,708

(22) Filed: Aug. 25, 2016

(51) Int. Cl.
*H04W 4/04* (2009.01)
*H04B 17/318* (2015.01)
*H04L 29/08* (2006.01)
*H04W 88/16* (2009.01)

(52) U.S. Cl.
CPC ............ *H04W 4/04* (2013.01); *H04B 17/318* (2015.01); *H04L 67/02* (2013.01); *H04W 88/16* (2013.01)

(58) Field of Classification Search
CPC ............ G06K 7/0008; G06K 19/0723; G06K 7/10366; G06Q 10/087

USPC ................... 455/414.1, 414.2; 340/8.1, 10.4
See application file for complete search history.

(56) References Cited

U.S. PATENT DOCUMENTS

| 2016/0139238 A1* | 5/2016 | Bekkali | G01S 5/0252 342/463 |
| 2017/0063476 A1* | 3/2017 | Nair | H04B 17/27 |
| 2017/0137043 A1* | 5/2017 | Barnes | B61G 7/14 |

* cited by examiner

*Primary Examiner* — Sam Bhattacharya
(74) *Attorney, Agent, or Firm* — Georgiy L. Khayet (57) ABSTRACT

A real-time location system (RTLS) includes wireless signal collectors, gateway devices, wireless tags, mobile devices, server, and web portal. The gateway devices receive sense signals associated with targets from the wireless signal collectors. Each of the sense signals includes a measurement value (e.g., a RSSI value), an identification of respective wireless signal collector, and an identification of a wireless tag or mobile device of a target. The gateway devices calculate the current geographical location of the targets based on the sense signals. The gateway devices send location data of the targets to the server for further processing and storing in a data storage. The web portal is operable to simultaneously display visual representations of real-time location data of multiple targets and statistical information.

19 Claims, 7 Drawing Sheets

SYSTEM AND METHOD FOR DISCOVERY AND COLLECTION OF REAL-TIME LOCATION DATA

BACKGROUND

Technical Field

This disclosure generally relates to tracking and locating individuals within a predetermined geographical area. More particularly, this disclosure relates to a system and method for discovering and collecting real-time location data using wireless signal collectors and a gateway device.

Description of Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Location services and navigation are important tools in mobile devices and smartphones. Typically, these devices use Global Navigation Satellite System (GNSS), such as Global Positioning System (GPS) or GLONASS navigation system, for geo-spatial positioning. However, GNSS-based services are not generally available inside buildings, tunnels, or other areas where GNSS signals cannot be acquired.

There are a number of non-GNSS technologies for indoor positioning such as Pedestrian Dead Reckoning (PDR), inertial navigational systems, magnetic positioning systems, and the like. Other systems take advantage of existing wireless technologies to perform geo-positioning. These wireless technologies can include Wi-Fi-based positioning systems (WPS), Bluetooth-based positioning systems, Radio-Frequency Identification (RFID) systems, and others. Yet other systems for indoor positioning include video processing systems, ultrasound-based systems, visible light communication systems, and so forth. Today, the above-listed indoor positioning systems are not accurate enough for effective integration in marketing and customer engagement applications. Moreover, the known systems can be impossible to scale to enterprise-grade applications involving thousands of users. Yet other problems of existing technologies include complexity of deployment of the above-listed systems.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of this disclosure refer to a Real-Time Location System (RTLS) and a method for discovering and collecting real-time location data. An example method comprises the step of receiving, by a gateway device, a plurality of sense signals associated with a target (e.g., an individual or asset item). Each of the sense signals is generated by at least one wireless signal collector. Moreover, each of the sense signals includes a measurement value, an identification of the respective wireless signal collector, and at least one of an identification of a wireless tag and an identification of a mobile device. The gateway device calculates a location of the target based on the plurality of sense signals. The gateway device sends the location data of the target to a server for aggregation and storing in a data storage. The server can process the location information associated with a plurality of targets to generate statistical data. The statistical data becomes available to authorized clients via a graphical user interface (GUI) maintained by a web portal. The web portal is operable to simultaneously display visual representations of the statistical data and real-time location data of targets on premises of the entity.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Aspects of the embodiments will now be presented with reference to a system and method for its operation. These system and method will be described in the following detailed description and illustrated in the accompanying drawings by various blocks, components, circuits, steps, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM), or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

The present teachings are generally concerned with a RTLS that enables detecting and tracking the current geographical location of a target, whether indoors or outdoors. The term "target" shall be construed to mean any movable object such as an individual, vehicle, shopping cart, mobile device, wireless tag, mote device, and so forth. The RTLS is a multi-protocol system integrating Wi-Fi™, Bluetooth™, Ultra-Wide Band (UWB), Ethernet, Machine-to-Machine protocols, any other wireless technologies, or any combinations thereof. The present teachings also provide for proximity marketing applications empowered by the RTLS, which enable generating individualized marketing, promotion, or customer engaging messages, and delivering the same to targeted individuals via one or more electronic devices based on the current geographical location of these individuals and other predetermined criteria. Yet other aspects of this disclosure provide for location analytics of data gathered by the RTLS. The location analytics can provide for visual representations of real-time location tracking, foot traffic metrics, dwell time metrics, customer-related metrics, and so forth. Thus, the present teachings can be used in many business-to-business and business-to-consumer solutions including, but not limited to, customer behavior analytics, automated decision making for business, mobile marketing automation, proximity marketing, mobile customer loyalty services, indoor guidance or navigation services, security solutions, asset and personnel location tracking, access control, and so forth.

The RTLS includes several hardware and software components. First, the RTLS includes one or more Power Beacon devices or WiRange devices, which are collectively referred herein to as "wireless signal collectors" for simplicity. The wireless signal collectors are configured to collect wirelessly received signals from mobile devices (e.g., smartphones, tablet computers, smartwatches, and wearables) or wireless tags (e.g., RFID devices, BLE devices, Wi-Fi devices, Wi-Fi HaLow devices, wireless mote devices, iBeacon devices, and so forth), process ranging information of these signals, and further propagate it to a Power Gate server for RTLS calculations. The wireless signal collectors integrate several wireless technologies in a single box. For example, the wireless signal collectors can be configured to receive Wi-Fi™ signals (e.g., simultaneous 2.4 GHz and 5 GHz Wi-Fi sniffing based on IEEE 802.11 standards), Bluetooth™ signals (e.g., with iBeacon™ and Eddystone™ protocol provisioning), and UWB (IEEE 802.15.4-2011) signals. In some embodiments, there can be a two-way communication link between these wireless signal collectors and mobile devices and wireless tags. Accordingly, the wireless signal collectors can also serve as a remote management gateway for wireless tags, which enables remote monitoring, configuration, and firmware upgrades for the wireless tags. The wireless signal collectors are stand-alone devices that can have an internal processing unit, memory, and network interface for communicating with one or more servers or computing devices. The wireless signal collectors are operable without the need to install mobile applications on mobile devices to enable their location tracking. Moreover, there is no need for the mobile device to be connected to a local Wi-Fi network so as to be tracked by the wireless signal collectors.

The wireless tags can refer to location tags, RFID tags, Near Field Communication (NFC) cards, wireless mote devices, WiBeat devices, BLE devices, Wi-Fi devices, Wi-Fi HaLow devices, iBeacon devices, and the like. The term "tag" shall be construed broadly to mean any electrical device suitable for practicing the embodiments described herein. Each wireless tag can have an unique identifier such as a Universally Unique Identifier (UUID), Major-Minor ID, BLE ID, Wi-Fi ID, and so forth.

In some embodiments, the wireless tags can include electronic devices for broadcasting wireless signals to the wireless signal collectors. The wireless signals can be repeatedly broadcasted (e.g., with a rate in a range from 0.1 Hz to 10 Hz) or they can be broadcasted in response to an inquiry received from a wireless signal collector. The wireless signals can be propagated up to about 300 meters with the transmission power from about −18 dBm to about 8 dBm. In some embodiments, the wireless tags support Ethernet standards, Bluetooth standards, including Bluetooth Low Energy (BLE) standards, iBeacon standard, Eddystone standard, and the like. The wireless tags are stand-alone devices with an independent source of energy (e.g., a battery), processing means, memory, and radio interface for broadcasting wireless signals. The wireless tags can be coupled, secured, glued, or fixed to any items of interest. For example, they can be attached to goods in a retail store, items in a warehouse, shopping carts, vehicles, individuals, and so forth. The wireless tags can be also managed remotely via the wireless signal collectors. The remote management can include software updates, maintenance, and support.

The RTLS can provide three different system architectures to enable tracking and monitoring of targets in real time. According to a first example system architecture, the mobile devices act as wireless tags and emit wireless signals that are then collected by one or more wireless signal collectors and transmitted to the gateway device for further processing as described herein. According to a second example system architecture, the wireless tags emit wireless signals that are then collected by one or more wireless signal collectors and transmitted to the gateway device for further processing as described herein. According to a third example system architecture, the wireless tags emit wireless signals that are then collected by at least one of the mobile devices which act as signal collectors and gateway devices for determining a wireless tag location.

The Power Gate server provides a back-end RTLS engine service. The Power Gate server can be installed remotely. Alternatively, the Power Gate server can be installed on or near premises of the area where location tracking is performed. Particularly, the Power Gate server receives the collected wireless signals from two or more wireless signal collectors and performs location calculations. The wireless signals include at least one measurement metric such as Received Signal Strength Indicator (RSSI), Time of Flight (ToF), or Time of Arrival (ToA). As will be described below, the location of one or more targets (e.g., individuals, mobile devices, or wireless tags) can be calculated based on a multilateration procedure applied to measurement metric values from a selected cell, which are then applied to a least squares analysis such as the Levenberg-Marquardt algorithm. The location data can be then collected and stored by a Power Controller server in data storage such as cloud storage or distributed memory. The Power Controller server can also provide location analytics based on the collected location data including statistical data, heat maps, graphs, tables, various metrics, and so forth, which characterize behavior of multiple targets (e.g., customers, pedestrians, vehicles, items in a warehouse, etc.) in a given area (e.g., a retail store, trade mall, hospital, airport, city area, parking lot, and the like) in real time or over a predetermined period. The Power Controller server is also connected to a Connected Venue Operator (CVO) Web Portal (referred herein to as "web portal" for simplicity), which provides one or more GUIs for authorized clients, such as managers or officers of retail stores, trade malls, hospitals, airports, and the like. The web portal provides to the authorized clients visual representation of target locations in real time and also visual representation of the statistical data, heat maps, graphs, tables, foot traffic metrics, or other metrics for further analysis. The web portal can also provide notifications, messaging, reporting, Point of Interest (POI) management, geo-fencing, maps creation and editing, indoor routing, user and device management, and so forth.

The real-time location of targets can be also used by the Power Controller server or other third-party services for proximity advertising, sending push notifications or messages to the targets, and so forth. For example, the Power Controller server can cause delivering to a mobile device of a particular individual a purchase offer or marketing message associated with one or more goods based on the current geo-location of the individual or his interaction with a particular good equipped with a wireless tag.

Thus, the RTLS provides both the engagement and analysis of foot traffic in one or more predetermined areas, whether indoors or outdoors. The architecture of RTLS provides easy scaling to enterprise-grade applications involving thousands of wireless signal collectors and thousands of targets. These applications can be helpful not only for retail purposes or asset tracking, but also for analysis of pedestrian and vehicle traffic in given city areas, which can help to develop city infrastructure. Moreover, the architecture of RTLS provides high location detection accuracy. Particularly, in some embodiments, the RTLS may provide location detection accuracy less than about 2 meters, when Wi-Fi or BLE wireless signals are received, and less than about 20 centimeters, when UWB wireless signals are received and processed.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Additionally, all ranges provided herein include the upper and lower values of the range unless explicitly noted. For example, the term "about" shall mean a reasonable deviation from a value accompanying this term. If it is not specified otherwise, the term "about" may refer to a variation of 10% from an indicated value. In the case of a range of values, the term "about" may refer to a 10% variation from both the lower and upper limits of the range.

It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

Moreover, it shall be understood that when an element is referred to as being "connected" or "coupled" to another element, it can be directly connected or coupled to the other element or it can be indirectly, but operatively, connected or coupled via one or more intervening elements.

The term "mobile device" shall mean any electronic device having a network interface and configured to emit wireless signals and optionally communicate with the wireless signal collectors and other devices. Some examples of mobile devices include, but not limited to, a cellular phone, mobile phone, smart phone, tablet computer, laptop computer, personal digital assistant, music player, multimedia player, portable computing device, navigation system, game controller, gaming device, game console, in-vehicle computer, infotainment system, entertainment system, and so forth. The term "mobile device" can also refer to a wearable device such as a fitness tracker, health monitor, smart watch, or any other electronic article with networking functionality that can be worn by an individual. In some embodiments, mobile devices can act as wireless tags and emit wireless signals that are then collected by wireless signal collectors. In other embodiments, mobile devices can act as wireless signal collectors for collecting wireless signals transmitted by wireless tags and as a gateway for processing the wireless signals.

The term "wireless signal" shall mean a radio frequency (RF) signal that can be transmitted at regular or irregular intervals within a predetermined frequency band.

The term "target" shall refer to one of the following: an individual, visitor, customer, prospective customer, pedestrian, vehicle, asset item, goods item, mobile device, and wireless tag.

Figure 1:
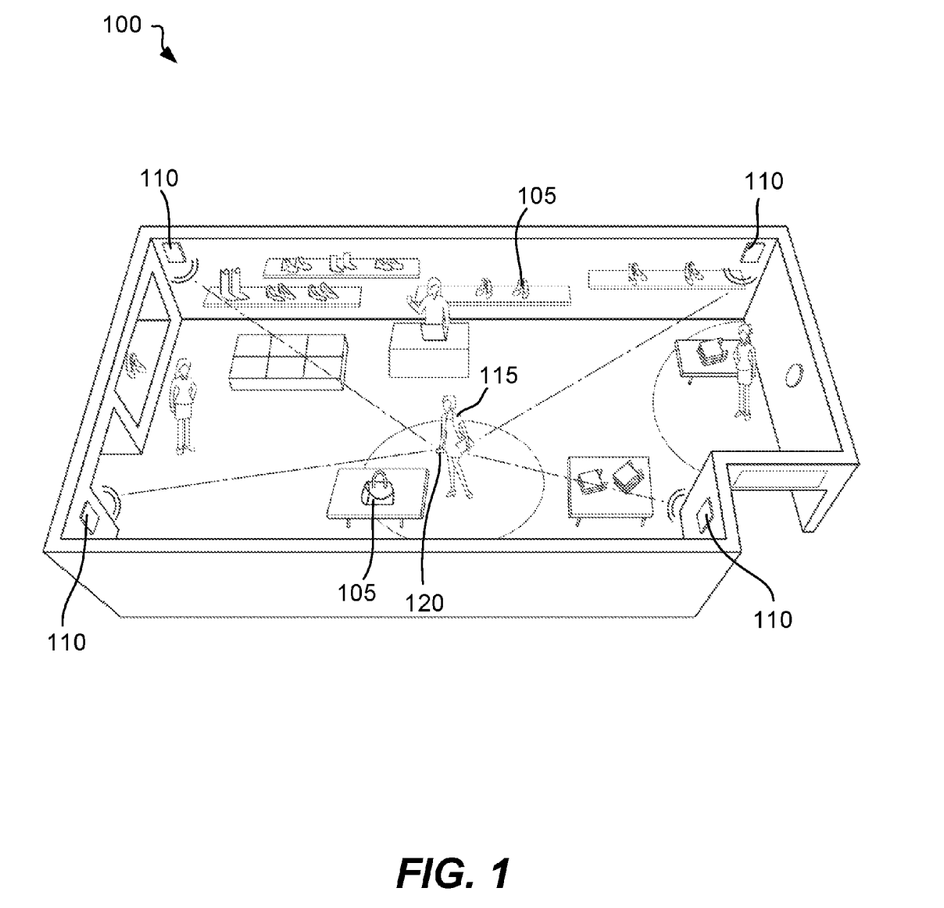
FIG. 1 shows an example environment (e.g., a retail store) suitable for practicing methods for discovering and collecting real-time location data.

Referring now to the drawings, various embodiments of RTLS and methods for discovering and collecting real-time location data will be described. FIG. 1 shows an example environment 100 where the methods for discovering and collecting real-time location data can be practiced. More specifically, FIG. 1 illustrates an axonometric view of a retail store, where a plurality of goods 105 are offered for sale. The environment 100 includes at least two wireless signal collectors 110. For example, as illustrated in FIG. 1, the retail store includes four wireless signal collectors 110 secured to walls and arranged substantially in corners of the retail store. Each of the wireless signal collectors 110 has a unique identifier (ID) and geographical location.

As outlined above, the present teachings provide for the detection and tracking of targets such as prospect customers 115 or other individuals. For these ends, the wireless signal collectors 110 perform measurements with a mobile device 120 of the prospect customer 115 or wireless tags. The measurements can relate to exchange or receipt of wireless signals indicating a signal strength, signal power, signal intensity, signal amplitude, signal quality, signal-to-noise ratio (SNR), or any other characteristic. In one example, the measurement value refers to RSSI, ToF, or ToA, which are acquired by the wireless signal collectors 110. Accordingly, each of the wireless signal collectors 110 can produce sense signals, each of which include a measurement value (e.g., a RSSI value), an identifier of wireless signal collector 110, and an identifier of mobile device 120 or an identifier of wireless tag. The sense signals can be repeatedly generated by the wireless signal collectors 110. For example, the sense signals are generated with intervals being in a range from about 1 millisecond to about 1,000 seconds. The sense signals are further used to determine and dynamically track the location of the prospect customer 115. The location data can be further used for analytical purposes such as to understand food traffic metrics, customer behaviors, moving patterns, and so forth. In other embodiments, the location data can be further used to provide the prospect customer 115 with one or more messages, push notifications, purchase offers, and the like via the mobile device 120 or other electronic devices such as displays arranged inside the retail store.

Figure 2:
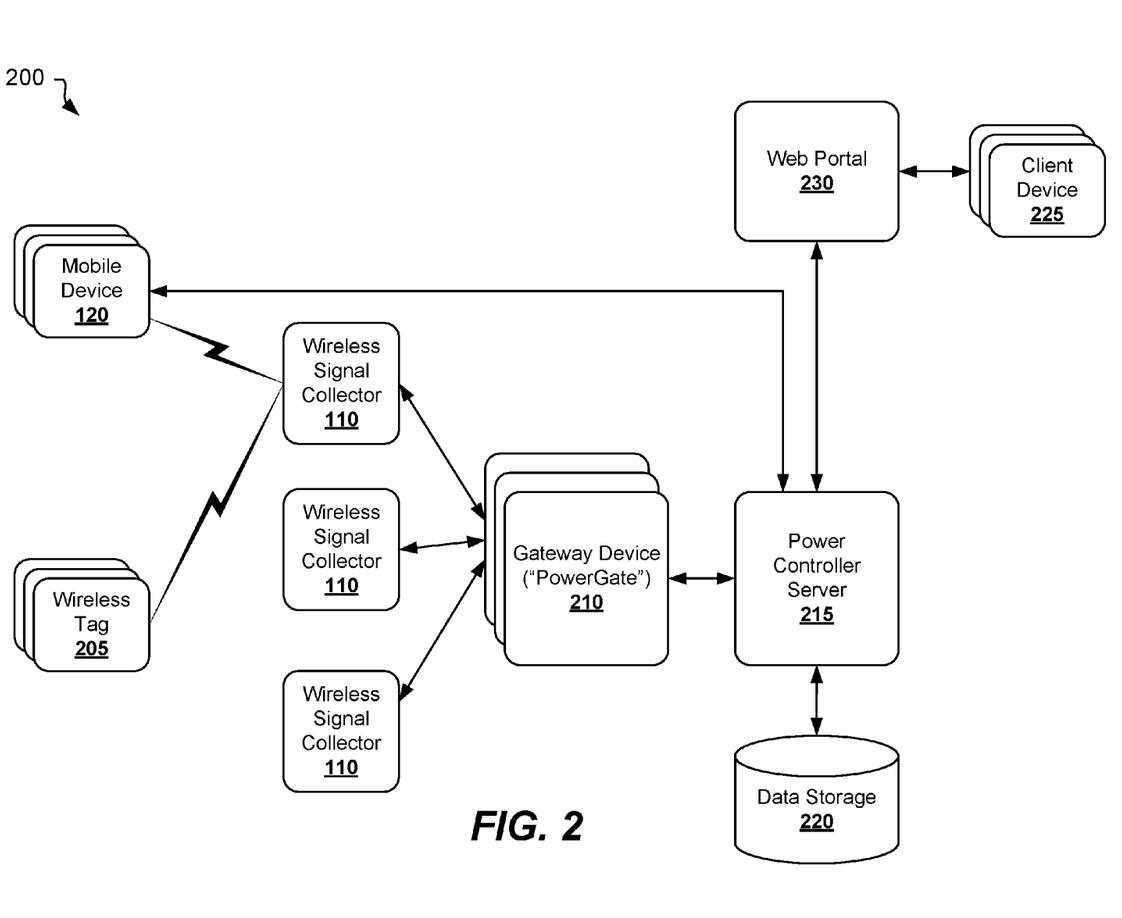
FIG. 2 shows an example RTLS suitable for practicing the methods for discovering and collecting real-time location data.

FIG. 2 shows a RTLS 200 suitable for practicing one or more methods for discovering and collecting real-time location data, according to some example embodiments. The RTLS 200 comprises a plurality of wireless signal collectors 110. The wireless signal collectors 110 are generally operable to collect measurement data with respect to at least one of mobile devices 120 and wireless tags 205. For these ends, the wireless signal collectors 110 can be configured to receive wireless signals from the mobile devices 120 or wireless tags 205 to produce measurement values such as RSSI values, ToF values, or ToA values. In some embodiments, the wireless signal collectors 110 can be configured to poll the mobile devices 120 or wireless tags 205 to produce or receive corresponding measurement values. The wireless signals received from the mobile devices 120 or wireless tags 205 can also bear an identifier of the mobile device 120 or wireless tag 205 with which a particular wireless signal is generated.

Once the wireless signal collectors 110 collect the measurement data from mobile devices 120 or wireless tags 205, the wireless signal collectors 110 can generate sense signals. Each sense signal is associated with the wireless signal collector 110 that produced this sense signal and a particular mobile device 120 or wireless tag 205. Accordingly, each sense signal includes: (a) a measurement value associated with a particular mobile device 120 or wireless tag 205, (b) an identifier of this mobile device 120 or wireless tag 205, and (c) an identifier of the wireless signal collector 110.

Still referring to FIG. 2, the RTLS 200 further comprises one or more Power Gate servers 210, which are also referred herein to as gateway devices. Each of the gateway devices 210 can be in operative communication with one or more of the wireless signal collectors 110 via one or more data networks. A data network can refer to any wired, wireless, or optical networks including, for example, the Internet, intranet, local area network (LAN), Personal Area Network (PAN), Wide Area Network (WAN), Virtual Private Network (VPN), Bluetooth™ radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network includes a corporate network, data center network, service provider network, mobile operator network, or any combinations thereof. Thus, the gateway devices 210 can be located remotely to an area where the wireless signal collectors 110 are employed. In other embodiments, however, the gateway devices 210 can be located in proximity of the area where the wireless signal collectors 110 are employed. For example, one gateway device 210 can be provided within premises of the area (e.g., a retail store) where the wireless signal collectors 110 are employed.

Each of the gateway devices 210 is configured to collect the sense signals received from two or more of the wireless signal collectors 110 and provide location calculations. In some embodiments, there are needed at least three wireless signal collectors 110 for determining a location of a target. In other embodiments, however even one wireless signal collector 110 may be sufficient for determining a location of a target.

The gateway device 210 calculates the current location of a particular target based on the sense signals associated with one and the same mobile device 120 (or wireless tag 205) and received from the wireless signal collectors 110. The gateway device 210 repeatedly aggregates the sense signals. For example, the sense signals can be collected in periods, which can be in a range from about 1 millisecond to about 100 seconds. Within each of the periods, the gateway device 210 can collect one or more sense signals. Further, the Gateway device 210 may optionally select a predetermined number of the received sense signals over another period being greater than the periods for receiving the sense signals. For example, the gateway device 210 can select only those received sense signals that has the measurement value higher than a predetermined threshold value. The gateway device 210 may then associate the received sense signals with one or more cells.

In yet further embodiments, at least one of the mobile devices 120 can be configured to perform the functionality of the gateway device 210. Accordingly, in these embodiments, the mobile device 120 can calculate the current location of a particular target based on the sense signals received from the wireless signal collectors 110, where these sense signals can be associated with some other mobile devices 120 or one or more wireless tags 205. The calculation of the current location by the mobile device 120 can be performed in a substantially the same manner as by the gateway device 210 described herein.

Figure 3:
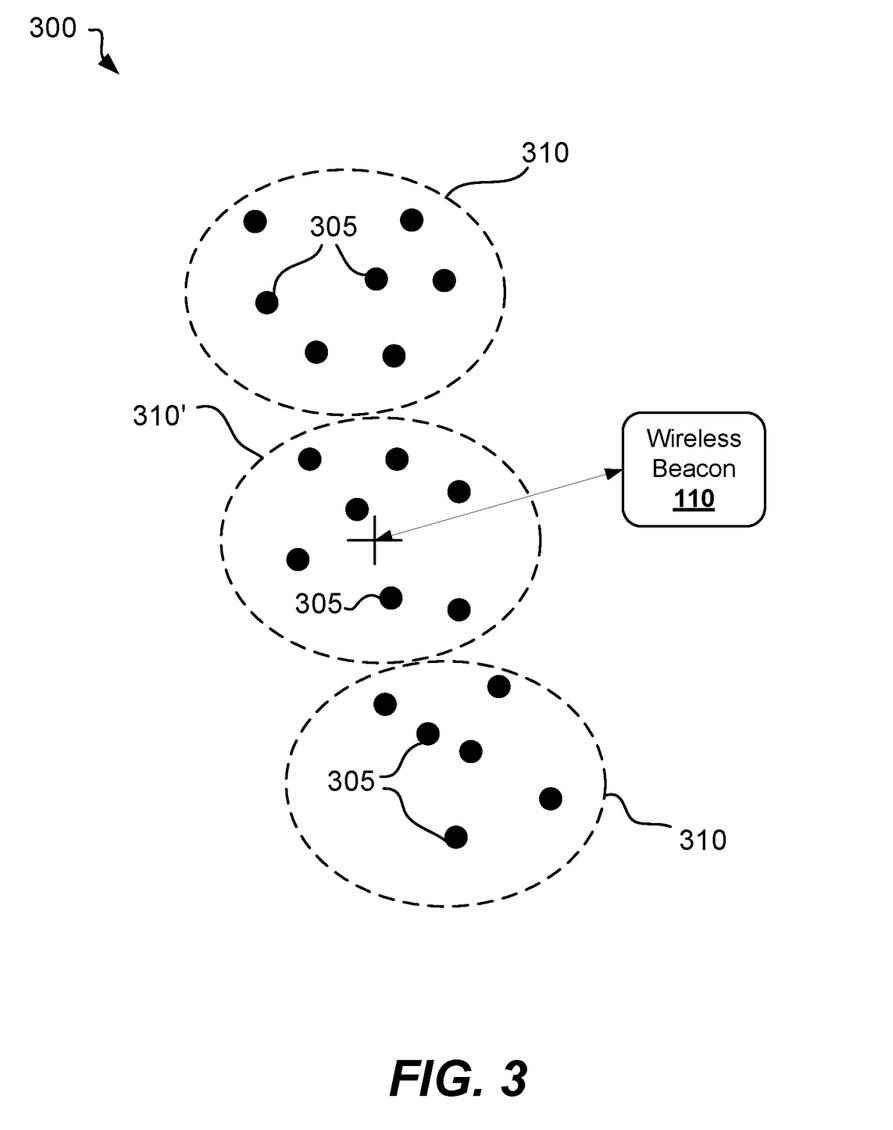
FIG. 3 illustrates cells associated with sense signals produced by a wireless signal collector.

FIG. 3 shows a block diagram 300 of cells associated with sense signals produced by a wireless signal collector 110, according to some example embodiments. More specifically, FIG. 3 shows a plurality of coordinates 305 for which the sense signals were generated by at least one wireless signal collector 110. The sense signals can be combined into cells 310, where each of the cells 310 is associated with measurement values being in a predetermined range. For example, one cell 310 can include sense signals having a RSSI value in a first range, while another cell 310 can include sense signals having a RSSI value in a second range, where the first range does not overlap with the second range. Accordingly, in some embodiments, the cells 310 are not overlapping. In alternate embodiments, however, the cells 310 can overlap (e.g., they can be nested). Each of the cells 310 can be also associated with a particular period over which the sense signals are received and selected. Thus, the cells 310 can dynamically change over time. The cells 310 can also be associated with one particular mobile device 120 or wireless tag 205.

Referring now to FIG. 2 and FIG. 3, the gateway device 210 can select the nearest cell to the wireless signal collector 110. For example, the gateway device 210 can select the cell 310' based on the measurement values. Moreover, in some embodiments, the gateway device 210 can perform noise suppression by eliminating one or more sense signals based on their measurement values. For example, all sense signals with the RSSI value less than about −75 dBm can be discarded. Additionally, the gateway device 210 can select only the strongest sense signal over a predetermined period (e.g., one second). The gateway device 210 then converts the sense signals into distance values (e.g., a distance in meters) to characterize distances between the wireless signal collector 110 to the locations 305 associated with the not-discarded sense signals within the nearest cell 310'. Further, the gateway device 210 can calculate a cathetus based on the distance values. The cathetus can be further used to calculate the location coordinates of a target. If, for example, the RTLS includes only one wireless signal collector 110, the location coordinates of a particular target can be substantially identical to the location coordinates of the wireless signal collector 110 or some other predetermined coordinates associated with this wireless signal collector 110.

If several wireless signal collectors 110 are used in the RTLS, the cathetus 315 of the wireless signal collector 110 is combined with at least one other cathetus associated with at least one other wireless signal collector 110 to perform multilateration. The multilateration is based on an algorithm to solve a least-squares curve fitting problem. For example, a Levenberg-Marquardt algorithm can be applied. The output of the multilateration procedure includes one or more location coordinates of a particular target (e.g., an individual, mobile device 120, wireless tag 205). Further, the gateway device 210 can perform velocity smoothing operation with respect to the location coordinates to produce location information.

The location information then supplied to a Power Controller server 215 via one or more data networks. The Power Controller server 215 also collects location information about other gateway devices 210, thereby aggregating location information of a plurality of targets within a plurality of areas. The location data can be also associated with particular entities. The term "entity" shall mean an organization, company, firm, administration, owner, or individual that controls a particular area or premises with wireless signal collectors 110, which produce the sense signals used for generation of location information. Therefore, in one example embodiment, the location information can be virtually linked to a retail store (i.e., an entity), where the wireless signal collectors 110 are deployed to track prospect customers 115.

In certain embodiments, the Power Controller server 215 can store the location information in data storage 220. The data storage 220 can be a memory device of Power Controller server 215 or a distributed memory (e.g., a cloud memory). The location information can be further available for accessing to by one or more client devices 225. The term "client device" shall mean any computing device with network functionality. For example, the client device 225 can include a desktop computer, workstation, laptop computer, tablet computer, mobile phone, smart phone, personal digital assistant, server, and so forth. The client device 225 can be controlled by authorized clients, which can include agents or officers of the entities described above, or by software applications via REST API. In certain additional embodiments, the Power Controller server 215 can also process the location information such as calculate statistical data (e.g., calculate foot traffic metrics).

Still referring to FIG. 2, the RTLS 200 further includes a CVO web portal 230 which can be accessed by the authorized clients via the client devices 225. The web portal 230 can provide GUIs or a dashboard to display location data in real time and also display past location data aggregated over a select period. In one example, the GUIs can display a map of at least one area associated with at least one entity. The map can include one or more icons characterizing the current geographical location of targets. The map can also include icons of wireless signal collectors 110 and gateway devices 210.

Furthermore, the web portal 230 can provide GUIs for displaying the statistical data. The statistical data can include foot traffic, customer behavior patterns, counts of visitors (customers, passengers, pedestrians, vehicles) in certain areas over a select period, counts of returned visitors (customers, passengers, pedestrians, vehicles) in certain areas over a select period, location popularity data, heat maps, average dwell times per area (entity) for a select period, and so forth. The GUIs enable the authorized clients to review the statistical information for any desired time period and any desired area. The authorized clients can also use the web portal 230 to control, manage, and update the wireless signal collectors 110, and to control, manage, and update the gateway devices 210. The authorized clients can also use the web portal 230 to generate marketing campaigns based on current location information, set rules of the marketing campaigns, and the like.

Figure 4:
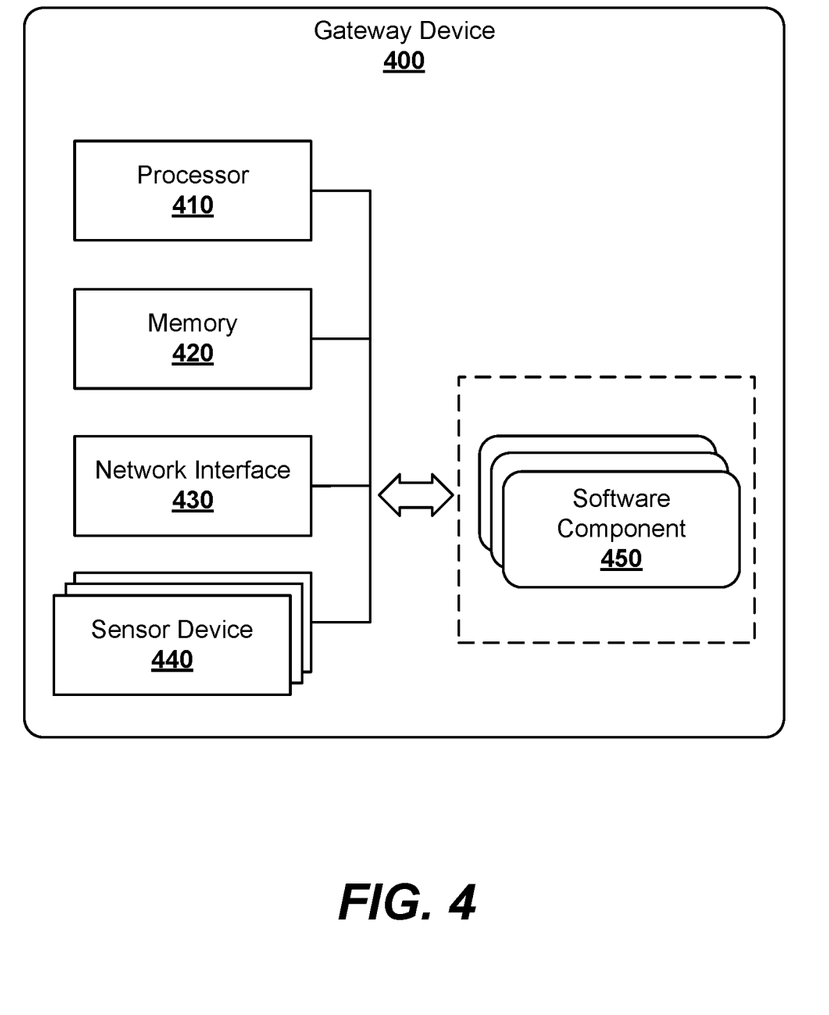
FIG. 4 shows a gateway device, according to an example embodiment.

FIG. 4 illustrates a gateway device 400, according to an example embodiment. The gateway device 400 may include at least one processor 410 and memory 420. Memory 420 stores, in part, instructions and data for execution by processor 410. Memory 420 can store the executable code when the gateway device 400 is in operation. The gateway device 400 may further include a network interface 430 and one or more sensing devices 440. The components of gateway device 400 can be connected via one or more communication buses or data transport means.

The network interface 430 can be utilized to communicate with external devices, external computing devices, servers, and networked systems via one or more data networks such as one or more wired, wireless, or optical networks including, for example, the Internet, intranet, LAN, WAN, cellular phone networks, Bluetooth radio, and an IEEE 802.11-based radio frequency network, among others. For example, the network interface 430 provides data exchange with the Power Controller server 215.

The sensing devices 440 are configured to produce the sense signals as described above. For these ends, the sensing devices 440 can be operable to receive wireless signals from mobile devices 120 or wireless tags 205 and process the wireless signals to generate the sense signals.

The gateway device 400 can also include one or more software components 450, which can include processor-executable code or instructions stored in the memory 420. The software components 450 can include software, middleware, or firmware enabling the operation of the gateway device 400 to produce the sense signals as described herein.

Figure 5:
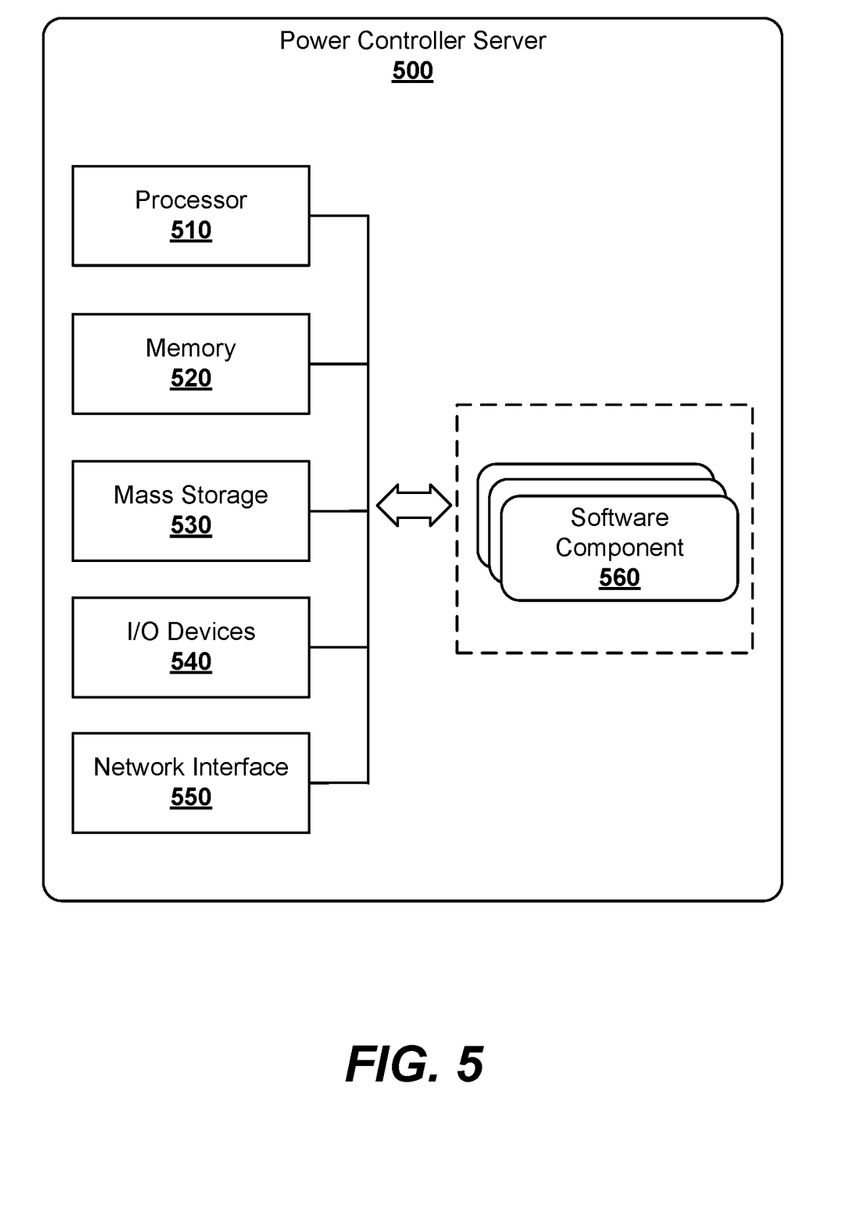
FIG. 5 illustrates a power controller server, according to one example embodiment.

FIG. 5 illustrates a Power Controller server 500, according to one example embodiment. The Power Controller server 500 may include at least one processor 510 and memory 520. Memory 520 stores, in part, instructions and data for execution by processor 510. Memory 520 can store the executable code when the Power Controller server 500 is in operation. The Power Controller server 500 may further include an optional mass storage device 530, one or more optional input/output (I/O) devices 540, and a network interface 550. The components of server 500 may be connected through one or more data transport means.

Optional I/O devices 540 provide a portion of a user interface. The I/O devices 540 may include an alphanumeric keypad, such as a keyboard, for inputting alphanumeric and other information, or a pointing device, such as a mouse, a trackball, a stylus, or cursor direction keys. Additionally, the I/O devices 540 can also include displays, touchscreens, speakers, and printers. The network interface 550 can be utilized to communicate with external devices, such as client devices 225 and gateway devices 210 via one or more data networks.

The components contained in the Power Controller server 500 are those typically found in computer systems, such as servers, that may be suitable for use with embodiments described herein. Thus, the Power Controller server 500 can be a server, personal computer (PC), workstation, mainframe computer, or any other computing device.

Furthermore, the Power Controller server 500 can also include one or more software components 560, which can include processor-executable code or instructions stored in the memory 520. The software components 560 can include software, middleware, or firmware enabling the operation of the Power Controller server 500 to perform operations presented above.

Figure 6:
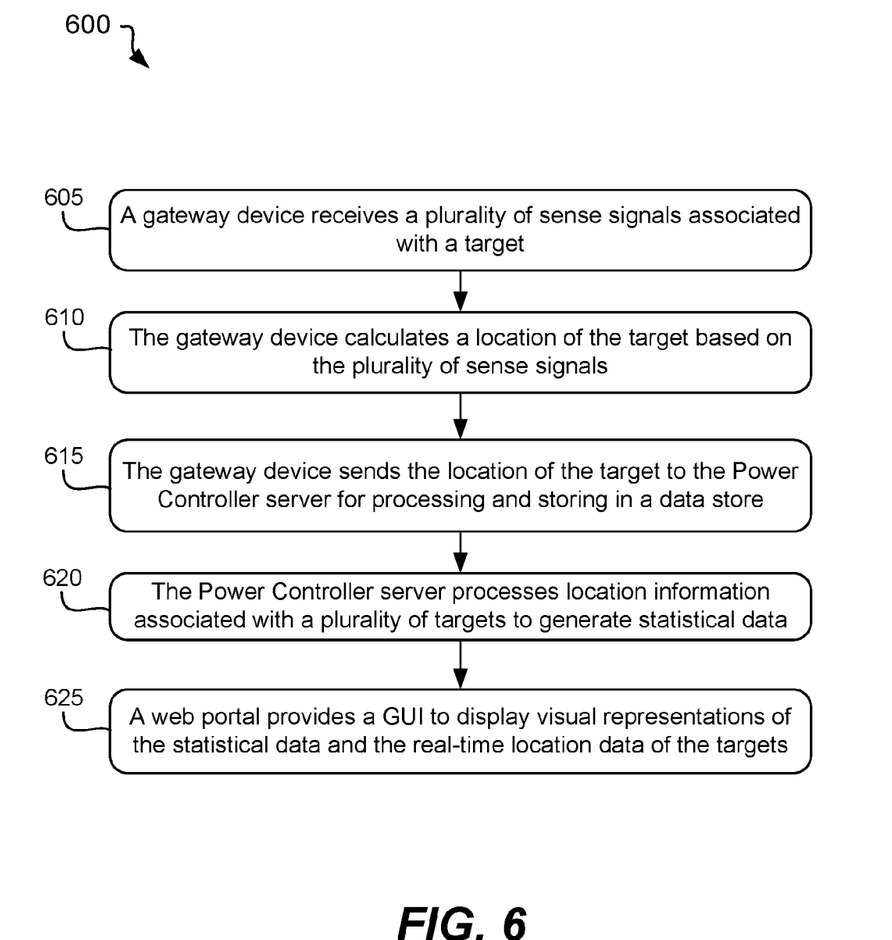
FIG. 6 is a process flow diagram showing a method for discovering and collecting real-time location data, according to an example embodiment.

FIG. 6 is a process flow diagram showing a method 600 for discovering and collecting real-time location data, according to an example embodiment. The method 600 may be performed by processing logic that may comprise hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the processing logic that implements the method 600 refers to the gateway device 210 and the Power Controller server 215. Notably, below recited steps of the method 600 may be implemented in an order different than described and shown in the figure. Moreover, the method 600 may have additional steps not shown herein, but which can be evident for those skilled in the art from the present disclosure. The method 600 may also have fewer steps than outlined below and shown in FIG. 6.

The method 600 commences at step 605 with the gateway device 210 receiving a plurality of sense signals associated with a target (e.g., an individual or asset item) each first time period. The sense signals are received from the wireless signal collector 110. Each of the sense signals includes a measurement value associated with an identification of the wireless signal collector 110 and at least one of the following: an identification of wireless tag 205 and an identification of mobile device 120. The measurement value can include a characteristic of strength, power, noise, or quality of a wireless signal. For example, the measurement value include a RSSI value. The wireless tag 205 or mobile device 120 can be attached to or held by the target.

At step 610, the gateway device 210 dynamically calculates a location of the target based on the plurality of sense signals. The location can be associated with an entity (e.g., a retail store) based on the identification of the wireless signal collector 110.

At step 615, the gateway device 210 sends the location of the target to the Power Controller server 215 to cause the Power Controller server 215 to process and store the location of the target in the data storage 220. The location of the target also becomes instantly available to view via the web portal 230.

At step 620, the Power Controller server 215 processes location information associated with a plurality of targets to generate statistical data. At step 625, the web portal 230 provides a GUI or dashboard for the authorized clients of the entity to display one or more visual representations of the statistical data and the real-time location data of the targets.

Figure 7:
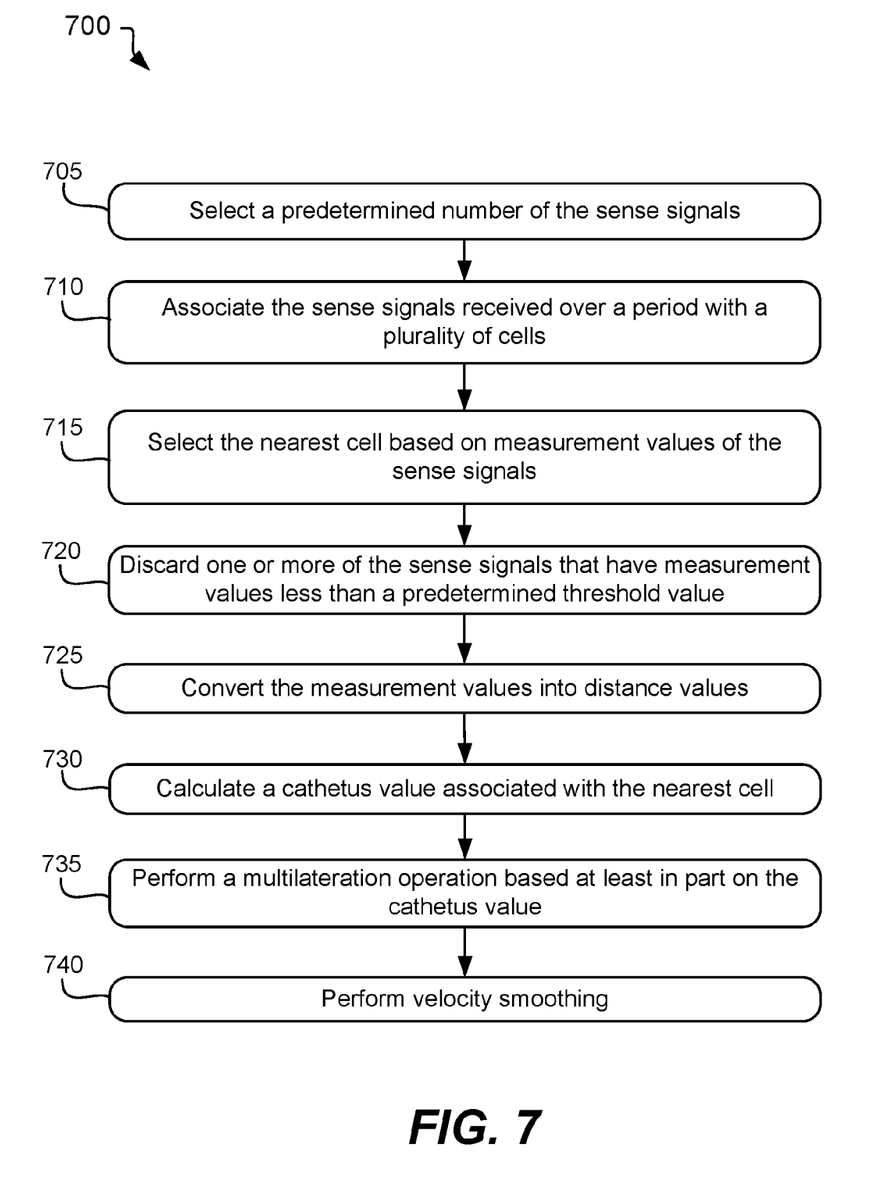
FIG. 7 is a process flow diagram showing a method for calculating a location of a target based on a plurality of sense signals.

FIG. 7 is a process flow diagram showing a method 700 for calculation by the gateway device 210 of a location of a target based on a plurality of sense signals, according to an example embodiment. The method 700 may be performed by processing logic that may comprise hardware (e.g., decision-making logic, dedicated logic, programmable logic, ASIC, and microcode), software (such as software run on a general-purpose computer system or a dedicated machine), or a combination of both. In one example embodiment, the method 700 can be implemented by the gateway device 210. The steps of method 700 may be implemented in an order different than described and shown in the FIG. 7. Moreover, the method 700 may have additional steps not shown herein, but which can be evident for those skilled in the art from the present disclosure. The method 700 may also have fewer steps than outlined below and shown in FIG. 7.

The method 700 commences at step 705 with the gateway device 210 selecting a predetermined number of the sense signals received over a second period, where the second period is greater than the first period mentioned in the step 605 of FIG. 6. The predetermined number of the sense signals can be selected based on the measurement values. For example, the measurement values can include one or more of the following: a RSSI value, a ToF value, or a ToA value.

At step 710, the gateway device 210 associates the sense signals received over the second period with a plurality of cells 310. Each of the cells 310 can be associated with those of the sense signals that include the measurement values within a predetermined range. At step 715, the gateway device 210 selects the nearest cell 310' based on the measurement values of the sense signals.

At step 720, the gateway device 210 discards one or more of the sense signals that have measurement values less than a predetermined threshold value. For example, all sense signals with the measurement values less than −75 dBm are discarded. At step 725, the gateway device 210 converts the measurement values into distance values (e.g., metric coordinates). At step 730, based on the distance values, the gateway device 210 calculates a cathetus value 315 associated with the nearest cell 310', the wireless signal collector 110, and the target.

At step 735, the gateway device 210 performs a multilateration operation based at least in part on the cathetus value 315 associated with the wireless signal collector 110 and the target and at least one other cathetus value associated with another wireless signal collector 110 but with the same target. The multilateration can be performed based on a Levenberg-Marquardt algorithm. Further, based on the multilateration, the gateway device 210 produces location coordinates of the target. At step 740, the gateway device 210 performs velocity smoothing with respect to the location coordinates. The location coordinates characterize the current geographical location of the target within the area of the entity. The location coordinates can be delivered to the Power Controller server 215, the data storage 220, or web portal 230 for further processing as described above.

Thus, the system and method for discovering and collecting real-time location data have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A real-time location system, the system comprising:
   at least one wireless signal collector, wherein the at least one wireless signal collector is for deploying on premises of an entity and configured to provide wireless multi-protocol communication with a plurality of wireless tags and a plurality of mobile devices; and
   a gateway device comprising at least one processor and a memory storing processor-executable codes, wherein the at least one processor is configured to implement the following operations upon executing the processor-executable codes:
      receiving a plurality of sense signals associated with a target each first period, each of the sense signals being generated by the at least one wireless signal collector being in operative communication with the gateway device, wherein each of the sense signals includes a measurement value associated with an identification of the at least one wireless signal collector and at least one of an identification of a wireless tag and an identification of a mobile device;
      dynamically calculating a location of the target based on the plurality of sense signals, the location being associated with the entity based on the identification of the at least one wireless signal collector; and
      sending the location of the target to a server for aggregation and storing in a data storage.

2. The system of claim 1, wherein the server is configured to process location information associated with a plurality of targets to generate statistical data;
   wherein the system further comprises a web portal operable to provide a graphical user interface for authorized clients of the entity, wherein the graphical user interface is operable to display visual representations of the statistical data and real-time location data of targets on premises of the entity, wherein each target is associated with an individual or an asset item.

3. The system of claim 1, wherein the calculation by the gateway device of the location of the target based on the plurality of sense signals comprises:
   selecting a predetermined number of the sense signals received over a second period, wherein the second period is greater than the first period;
   associating the sense signals received over the second period with a plurality of cells;
   selecting a nearest cell based on measurement values of the sense signals received over the second period;
   based on the measurement values of the sense signals related to the nearest cell, calculating a cathetus value associated with the nearest cell, the at least one wireless signal collector, and the target;
   performing multilateration based at least in part on the cathetus value associated with the at least one wireless signal collector and the target and a cathetus value associated with another wireless signal collector, the at least one wireless signal collector, and the same target; and
   based on the multilateration, producing location coordinates of the target.

4. The system of claim 3, wherein the predetermined number of the sense signals is selected based on the measurement values.

5. The system of claim 3, wherein each of the cells is associated with those of the sense signals that include the measurement values within a predetermined range.

6. The system of claim 3, wherein the calculation by the gateway device of the location of the target based on the plurality of sense signals further comprises discarding one or more of the sense signals which have measurement values less than a predetermined threshold value.

7. The system of claim 3, wherein the calculation by the gateway device of the location of the target based on the plurality of sense signals further comprises converting the measurement values into distance values, wherein each of the measurement values includes a Received Signal Strength Indicator (RSSI) value, a Time of Flight (ToF) value, or a Time of Arrival (ToA) value.

8. The system of claim 3, wherein the calculation by the gateway device of the location of the target based on the plurality of sense signals further comprises performing velocity smoothing with respect to the location coordinates.

9. A method for discovering and collecting real-time location data, the method comprising:
   receiving by a gateway device a plurality of sense signals associated with a target each first period, each of the sense signals being generated by at least one wireless signal collector being in operative communication with the gateway device, wherein the at least one wireless signal collector is for deploying on premises of an entity and configured to provide wireless multi-protocol communication with a plurality of wireless tags and a plurality of mobile devices, wherein each of the sense signals includes a measurement value associated with an identification of the at least one wireless signal collector and at least one of an identification of a wireless tag and an identification of a mobile device;
   dynamically calculating by the gateway device a location of the target based on the plurality of sense signals, the location being associated with the entity based on the identification of the at least one wireless signal collector; and sending the location of the target by the gateway device to a server for aggregation and storing in a data storage.

10. The method of claim 9, further comprising:
processing by the server location information associated with a plurality of targets to generate statistical data; and providing a graphical user interface by a web portal for authorized clients of the entity, wherein the graphical user interface is operable to display visual representations of the statistical data and real-time location data of targets on premises of the entity, wherein each target is associated with an individual or an asset item.

11. The method of claim 9, wherein the location of the target s calculated by the gateway device with accuracy of less than about 20 centimeters.

12. The method of claim 9, wherein the calculation by the gateway device of the location of the target based on the plurality of sense signals comprises:

selecting a predetermined number of the sense signals received over a second period, wherein the second period is greater than the first period;

associating the sense signals received over the second period with a plurality of cells;

selecting a nearest cell based on measurement values of the sense signals received over the second period;

based on the measurement values of the sense signals related to the nearest cell, calculating a cathetus value associated with the nearest cell, the at least one wireless signal collector, and the target;

performing multilateration based at least in part on the cathetus value associated the at least one wireless signal collector and the target and a cathetus value associated another wireless signal collector, the at least one wireless signal collector, and the same target; and based on the multilateration, producing location coordinates of the target.

13. The method of claim 12, wherein the predetermined number of the sense signals is selected based on the measurement values.

14. The method of claim 12, wherein each of the cells is associated with those of the sense signals that include the measurement values within a predetermined range.

15. The method of claim 12, further comprising discarding one or more of the sense signals which have measurement values less than a predetermined threshold value.

16. The method of claim 12, further comprising converting the measurement values into distance values, wherein each of the measurement values includes a RSSI value, a ToF value, or a ToA value.

17. The method of claim 12, wherein the multilateration is performed based on a Levenberg-Marquardt algorithm.

18. The method of claim 12, further comprising performing velocity smoothing with respect to the location coordinates.

19. The method of claim 9, wherein all of the sense signals are generated by a single wireless signal collector.

* * * * *